(12) United States Patent
Hopkins

(10) Patent No.: US 9,836,794 B2
(45) Date of Patent: Dec. 5, 2017

(54) COMPUTER SYSTEM AND METHOD FOR DETECTING QUESTIONABLE SERVICE PROVIDERS

(71) Applicant: HARTFORD FIRE INSURANCE COMPANY, Hartford, CT (US)

(72) Inventor: James K. Hopkins, Garnet Valley, PA (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 434 days.

(21) Appl. No.: 14/257,652

(22) Filed: Apr. 21, 2014

(65) Prior Publication Data

US 2015/0302527 A1 Oct. 22, 2015

(51) Int. Cl.
*G06Q 50/22* (2012.01)
*G06Q 50/24* (2012.01)
*G06Q 40/08* (2012.01)
*G06Q 30/00* (2012.01)

(52) U.S. Cl.
CPC ......... *G06Q 40/08* (2013.01); *G06Q 30/0185* (2013.01)

(58) Field of Classification Search
CPC ......... G06Q 50/22; G06Q 20/22; G06Q 50/24
See application file for complete search history.

(56) References Cited

U.S. PATENT DOCUMENTS

| | | |
|---|---|---|
| 6,826,536 B1 | 11/2004 | Forman |
| 8,429,113 B2 | 4/2013 | Madhok et al. |
| 8,688,607 B2 | 4/2014 | Pacha |
| 2008/0172257 A1 | 7/2008 | Bisker et al. |
| 2008/0249820 A1 | 10/2008 | Pathria et al. |
| 2011/0246229 A1 | 10/2011 | Pacha |
| 2011/0313965 A1 | 12/2011 | Madhok et al. |
| 2012/0173289 A1 | 7/2012 | Pollard et al. |
| 2012/0191468 A1 | 7/2012 | Blue |
| 2012/0284044 A1 | 11/2012 | Bregante et al. |
| 2013/0006668 A1 | 1/2013 | Van Arkel et al. |
| 2013/0124223 A1 | 5/2013 | Gregg |
| 2014/0081652 A1* | 3/2014 | Klindworth ............ G06Q 10/10 705/2 |

* cited by examiner

*Primary Examiner* — Maroun Kanaan
(74) *Attorney, Agent, or Firm* — Howard IP Law Group, PC

(57) ABSTRACT

A computer system includes a data storage module. The data storage module receives, stores, and provides access to data related to payment requests submitted to an insurance company by service providers. The data storage module is coupled to a computer processor. Also coupled to the computer processor are a program memory, an input device and an output device. The input device is used to input information to identify a first service provider. The display device is used to display data about other service providers who are associated with the same insurance claims as the first service provider. The data displayed about the other service providers includes taxpayer identification numbers (TINs).

25 Claims, 16 Drawing Sheets

| Standardized Provider_ID | Claim_Identifier | Watch List? | Claims/ Subject TIN | Total Claims/ Provider | Avg days/ bill date/ date rec'd | Age/most recent bill |
|---|---|---|---|---|---|---|
| 12-3456789 [ABC Corp.] | ABC98765 | Yes | 24 | 43 | 12.6 | 8 |
| | ABC88776 | Yes | 24 | 43 | 12.6 | 8 |
| | ABC66777 | Yes | 24 | 43 | 12.6 | 8 |

12-3456789 [ABC Corp.]
2013 Billings Received on 21 Claims
InsCo Data Analytics 2013-12-13

Copy
Format
Sort
Filter ▶ — Clear
Group      Keep only selected items — 1404
           Hide...
           Value...

12-3456789 [ABC Corp.]
2013 Billings Received on 21 Claims
InsCo Data Analytics 2013-12-13

| Standardized Provider_ID | Claim_Identifier | Watch List? | Claims/ Subject TIN | Total Claims/ Provider | Avg days/ bill date/ date rec'd | Age/most recent bill |
|---|---|---|---|---|---|---|
| 12-3456789 [ABC Corp.] | ABC98765 | Yes | 24 | 43 | 12.6 | 8 |
| | ABC88776 | Yes | 24 | 43 | 12.6 | 8 |
| | ABC66777 | Yes | 24 | 43 | 12.6 | 8 |

Sort
Search —1505
Clear Filter
Select
00-1433001 (Bill Broomer, MD)
00-1523402 (Jane Smith, MD)
00-1743692 (Gloria Jones, MD)

OK   Cancel

FIG. 15

| Standardized Provider_ID | Claim_Identifier | Watch List? | Claims/ Subject TIN | Total Claims/ Provider | Avg days/ bill date/ date rec'd | Age/most recent bill |
|---|---|---|---|---|---|---|
| 12-3456789 [ABC Corp.] | ABC98765 | Yes | 24 | 43 | 12.6 | 8 |
| 12-3344556 [Jane Green, MD] | ABC98765 | No | 15 | 17 | 4.6 | 22 |
| 12-4455677 [Bill Brown, DC] | ABC98765 | No | 14 | 20 | 4.6 | 3 |
| 12-5566778 [Pat Grey, PT] | ABC98765 | Yes | 11 | 22 | 6.9 | 10 |
| 12-7788990 [Bill Brown, DC] | ABC66777 | No | 7 | 10 | 8.6 | 31 |
| 12-9876555 [Frank Jones, MD] | ABC66777 | No | 5 | 30 | 4.1 | 48 |
| 12-9988777 [Mary Black, MD] | ABC88776 | No | 5 | 34 | 32.5 | 100 |
| 12-8889997 [Bill Brown, DC] | ABC88776 | No | 2 | 6 | 7.4 | 122 |

12-3456789 [ABC Corp.]
Connected Provider Matrix
InsCo Data Analytics 2013-12-13

*FIG. 16*

COMPUTER SYSTEM AND METHOD FOR DETECTING QUESTIONABLE SERVICE PROVIDERS

FIELD

The present invention relates to computer systems and more particularly to computer systems that may aid in detecting questionable requests for payment made to insurers.

BACKGROUND

Insurance companies have concerns about questionable requests for payment that may be submitted by organized groups of service providers, especially medical providers. Such groups are often elusive, and may receive insurance benefit payments for questionable payment requests and then change locations and/or business identities before effective investigations and responses can take place.

One potential approach that could be taken by investigation units of insurers involves using conventional link analysis software programs. However, programs of this sort do not generally provide useful output when used to analyze large quantities of data. This is a significant disadvantage of conventional analysis tools, because the quantity of data to be analyzed for questionable links among service providers is often very large.

SUMMARY

A computer system is disclosed which includes a data storage module. Functions performed by the data storage module include receiving, storing and providing access to payment request records. The payment request records represent payment requests submitted to an insurance company by service providers.

The computer system also includes a computer processor that executes program instructions and analyzes the payment request records. The computer processor is coupled to the data storage module.

Further included in the computer system is a program memory, coupled to the computer processor, and which stores program instruction steps for execution by the computer processor.

In addition, the computer system includes an input device, which is coupled to the computer processor. The input device is operative to input information to identify a first service provider, and the first service provider is associated with a number of insurance claims.

Still further included in the computer system is a display device. The display device is coupled to the computer processor and displays results of the analysis of the payment request records. The information displayed by the display device includes other provider data which corresponds to other service providers who are also associated with at least one of the insurance claims with which the first service provider is associated. The other provider data displayed by the display device includes, for each of the other service providers: (a) provider identifying data; and (b) a taxpayer identification number (TIN).

The information displayed by the computer system about other service providers who share insurance claimants with a provider who is already of interest may reveal questionable aspects of payment requests made by the other providers and may do so rapidly enough to allow insurance company employees to forestall or defer payment of questionable requests.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIGS. 11-16 are simplified versions of example screen displays that may be provided by the computer system of FIG. 1 during process stages illustrated by FIG. 10.

DETAILED DESCRIPTION

In general, and for the purposes of introducing concepts of embodiments of the present invention, a computer system aggregates and analyzes data relating to insurance claims and service providers' requests for payment submitted to an insurance company. Data relating to the service providers may be presented by the computer system in a pivot analysis table (also referred to as a "pivot table"). A user may interact with the pivot table to expose links among service providers. By highlighting relationships of other service providers to a service provider who is believed to be questionable, the computer system may aid in detecting questionable requests for payment from the other service providers. The insurance company may then be able to take action to prevent payment of questionable payment requests.

Figure 1:
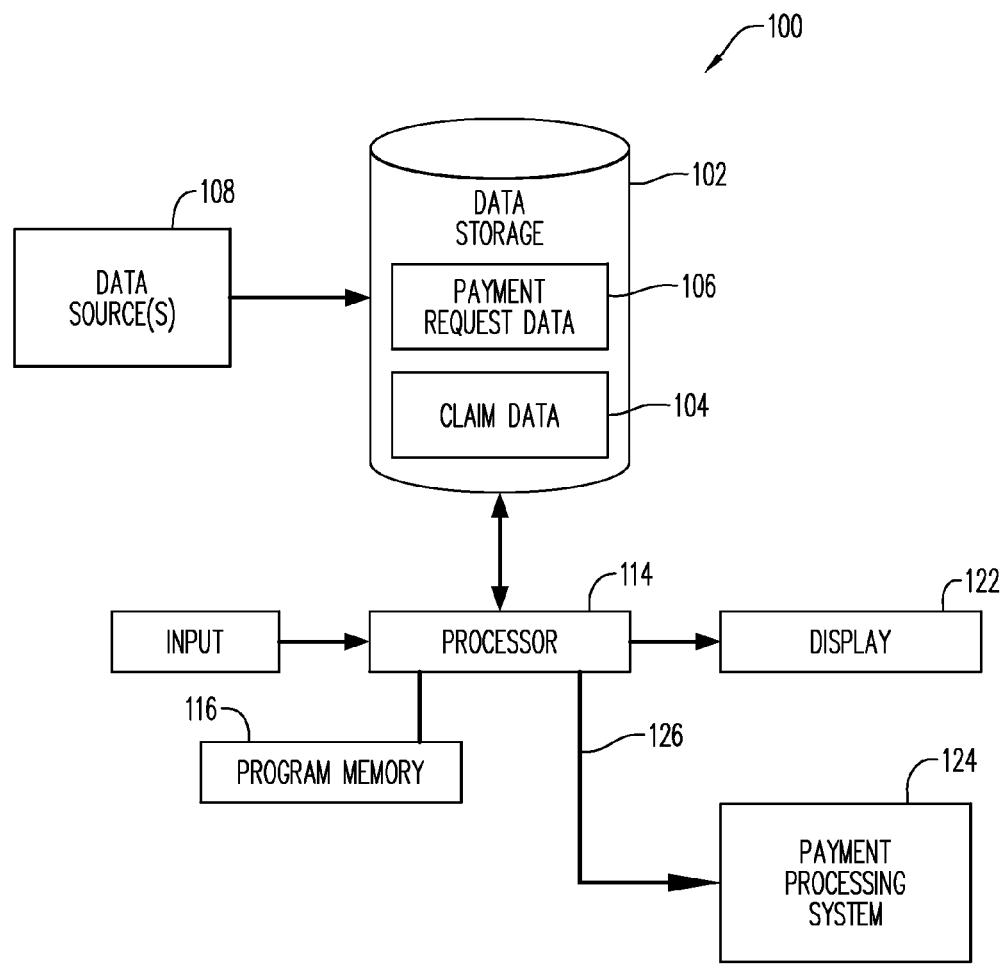
FIG. 1 is a partially functional block diagram that illustrates aspects of a computer system provided in accordance with some embodiments of the invention.

Features of some embodiments of the present invention will now be described by first referring to FIG. 1. FIG. 1 is a partially functional block diagram that illustrates aspects of a computer system 100 provided in accordance with some embodiments of the invention. For present purposes it will be assumed that the computer system 100 is operated by an insurance company (not separately shown) for the purpose of detecting relationships among potentially questionable service providers.

The computer system 100 includes a data storage module 102. In terms of its hardware the data storage module 102 may be conventional, and may be composed, for example, by one or more magnetic hard disk drives. In some embodiments, the data storage module 102 may take the form of a data warehouse. A function performed by the data storage module 102 in the computer system 100 is to receive, store and provide access to data relating to insurance claims (reference numeral 104) and data relating to payment requests from service providers (reference numeral 106). Additional types of data not specifically represented in FIG. 1 may also be stored in the data storage module 102, including various kinds of data that will be described below in connection with FIG. 3. Block 108 in FIG. 1 represents sources for the data stored in data storage module 102.

The computer system 100 also may include a computer processor 114. The computer processor 114 may include one or more conventional microprocessors and may operate to execute programmed instructions to provide functionality as described herein. Among other functions, the computer processor 114 may store and retrieve insurance claim data 104 and payment request data 106 in and from the data storage module 102. Thus the computer processor 114 may be coupled to the data storage module 102.

The computer system 100 may further include a program memory 116 that is coupled to the computer processor 114. The program memory 116 may include one or more fixed storage devices, such as one or more hard disk drives, and one or more volatile storage devices, such as RAM (random access memory). The program memory 116 may be at least partially integrated with the data storage module 102. The program memory 116 may store one or more application programs, an operating system, device drivers, etc., all of which may contain program instruction steps for execution by the computer processor 114.

The computer system 100 further includes a display device 122. The display device 122 may be coupled to the computer processor 114. A function of the display device 122 may be to display to a human operator information that has been compiled and analyzed by the computer system 100 and that relates to service providers who have submitted payment requests to the insurance company in connection with insurance claims made by policyholders. The data as displayed by the display device 122 may be generated by the computer processor 114 in accordance with program instructions stored in the program memory 116 and executed by the computer processor 114.

Still further, the computer system 100 is associated with a payment processing system 124. The payment processing system 124 may be operated by the insurance company that operates the computer system 100. The purpose of the payment processing system 124 is to process and pay bills (i.e., payment requests) submitted by service providers in connection with insurance claims under policies issued by the insurance company. In some embodiments, the same payment processing system 124 may also process and pay invoices submitted by suppliers to the insurance company. The payment processing system 124 may operate in a generally conventional fashion. As indicated at 126, there may be a communication channel from the computer processor 114 and the payment processing system 124. In some embodiments, the payment processing system 124 may be a source of some of the data stored in data storage module 102. Accordingly, blocks 108 and 124 may partially overlap each other in a practical embodiment of the computer system 100.

Figure 2:
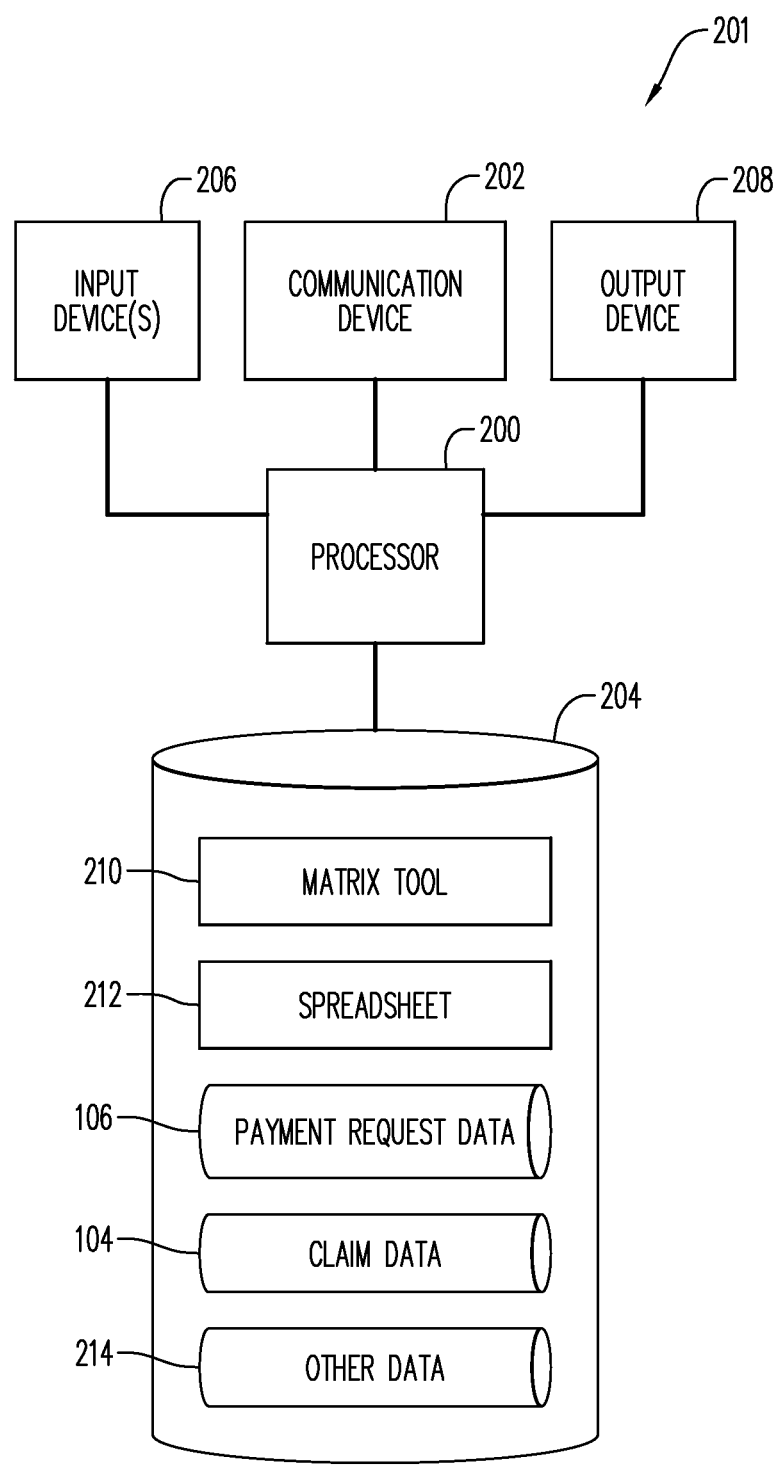
FIG. 2 is a block diagram that illustrates a computer that may form all or part of the system of FIG. 1.

FIG. 2 is a block diagram that illustrates a computer 201 that may form all or part of the system 100 of FIG. 1.

As depicted, the computer 201 includes a computer processor 200 operatively coupled to a communication device 202, a storage device 204, one or more input devices 206 and an output device 208. Communication device 202 may be used to facilitate communication with, for example, other devices (such as sources of data to be stored and analyzed by the computer 201). The input device(s) 206 may comprise, for example, a keyboard, a keypad, a mouse or other pointing device, a microphone, knob or a switch, an infrared (IR) port, a docking station, and/or a touch screen. The input device(s) 206 may be used, for example, to enter information. Output device 208 may comprise, for example, a display (e.g., the display device 122 shown in FIG. 1) a speaker, and/or a printer.

Continuing to refer to FIG. 2, storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 201 may be entirely conventional.

Storage device 204 stores one or more programs or portions of programs (at least some of which being indicated by blocks 210 and 212) for controlling processor 200. Processor 200 performs instructions of the programs, and thereby operates in accordance with the present invention. In some embodiments, the programs may include a program or program module 210 that acts as a matrix tool for aggregating and analyzing data relating to service providers.

Another program that may be stored on the storage device 204 is a spreadsheet program, represented by block 212. The spreadsheet program may be generally conventional, but may be configured and/or operated in a manner as described below to provide functionality in accordance with aspects of the present invention. There may also be stored in the storage device 204 other software, such as one or more conventional operating systems, device drivers, communications software, etc. The insurance claim data 104 and the payment request data 106, as previously described with reference to FIG. 1, are also shown in FIG. 2 as being stored on the storage device 204. In addition, the storage device 204 may store one or more additional types of data, as represented by database block 214 in FIG. 2. Examples of such other types of data will be described below in connection with FIG. 3.

Figure 3:
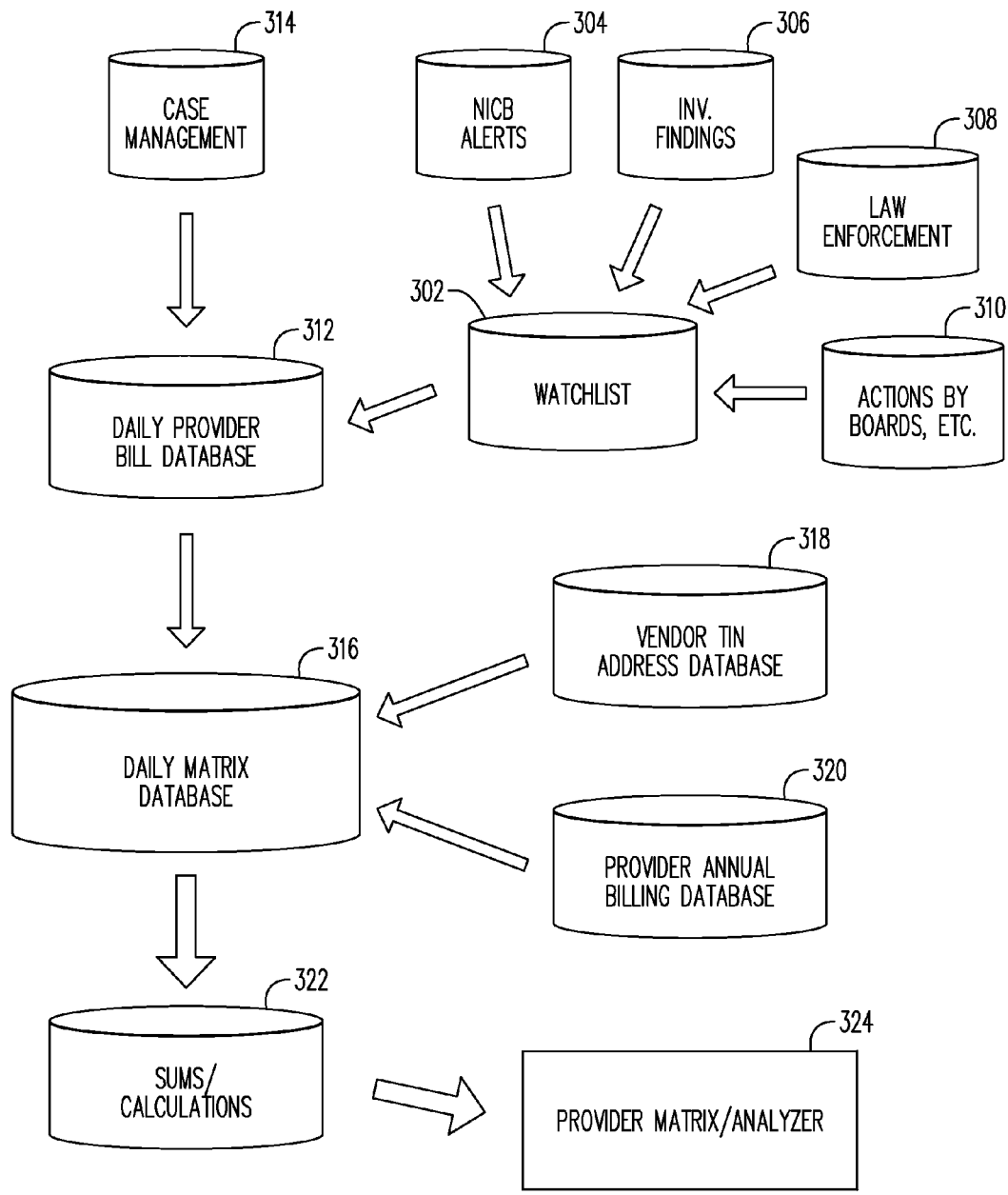
FIG. 3 is a diagram that illustrates data flows that may take place in the apparatus shown in FIGS. 1 and 2.

FIG. 3 is a diagram that illustrates data flows that may take place in the computer system 100 in accordance with aspects of the present invention.

A watch list database 302 may be aggregated from data sources such as (a) a feed 304 of NICB (National Insurance Crime Bureau) alert data, (b) a feed 306 of data representing findings by the insurance company's special investigations unit (SIU), (c) a feed 308 of data from law enforcement authorities, and (d) a feed 310 of data representing actions taken by professional licensing boards and the like for medical professionals. A potential purpose of the watch list database 302 is to raise possible warning flags about entities that may be service providers for the insurance company's claimant-policyholders.

The watch list data from the watch list database 302 may be supplied to a database 312 (daily provider billing database) that also stores data received on the previous day concerning bills (payment requests) that were submitted by service providers relating to claims made to the insurance company. The watch list data may provide supplementary information so that processing of the submitted bills may also take into account whether there are any cautionary flags about the providers who have submitted the bills. In addition, a feed 314 of case management data also supplies data to the daily provider billing database 312. The data from the case management data feed 314 may relate to information developed by the insurance company's special investigation unit (SIU) relating to cases of suspected wrongdoing that the SIU is or has been investigating. Again, this data may be helpful in raising cautionary flags about certain service providers who have submitted bills to the insurance company.

In some embodiments, the new bills from providers may be in a volume of 1,000 per day or more.

The data from the daily provider billing database 312 is further supplied to a daily matrix database 316. As will be seen, the daily matrix database 316 may serve as a fundamental resource to permit analysis of service providers and their possible interrelationships, in a manner that will be described below. Information relating to addresses of the service providers, keyed to the service providers' taxpayer identification numbers (TINS) is supplied to the daily matrix database 316 from a vendor TIN address database 318. With this geographically-related data incorporated into the daily matrix database 316, location-based analysis of the service provider billing data is made possible.

In addition, data relating to the annual total billings of the service providers is supplied to the daily matrix database 316 from a provider annual billing database 320.

As indicated at 322, operations may be performed to augment the daily matrix database 316 with summarizations of the data and/or additional calculated data fields to pre-process the matrix data prior to analysis and detection of connections among providers in accordance with aspects of the present invention. This matrix data analysis, to be described in detail below, is represented by block 324 in FIG. 3.

Figure 4:
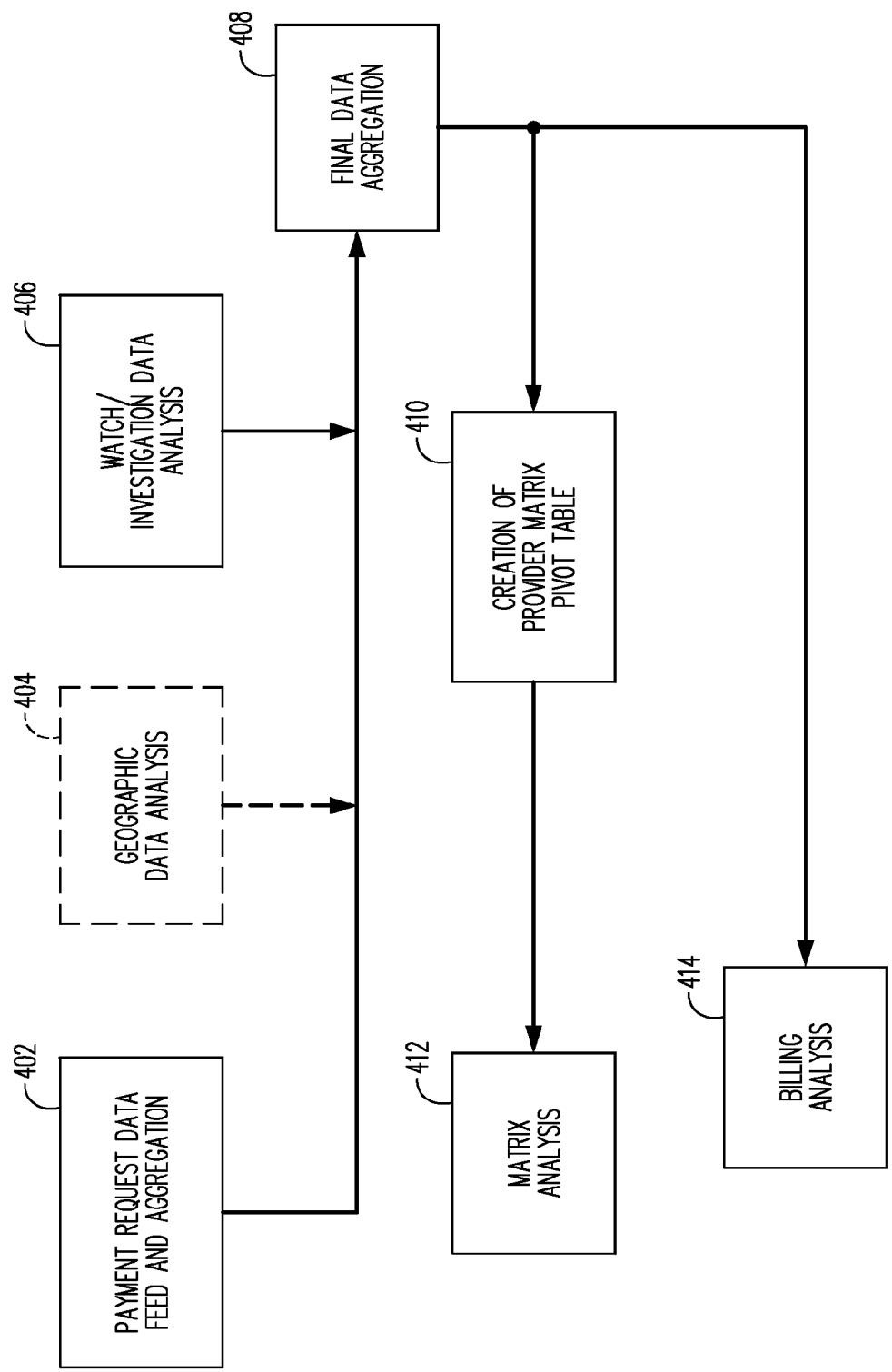
FIG. 4 is a high-level map of a process that may be performed in the system of FIG. 1.

FIG. 4 is a high-level map of a process that may be performed in the computer system 100 of FIG. 1. In effect, FIG. 4 in part provides a process-oriented view of the data flows shown in FIG. 3. Some of the high-level blocks shown in FIG. 4 will be described in some detail with reference to constituent flowcharts shown in FIGS. 5-8.

Figure 5:
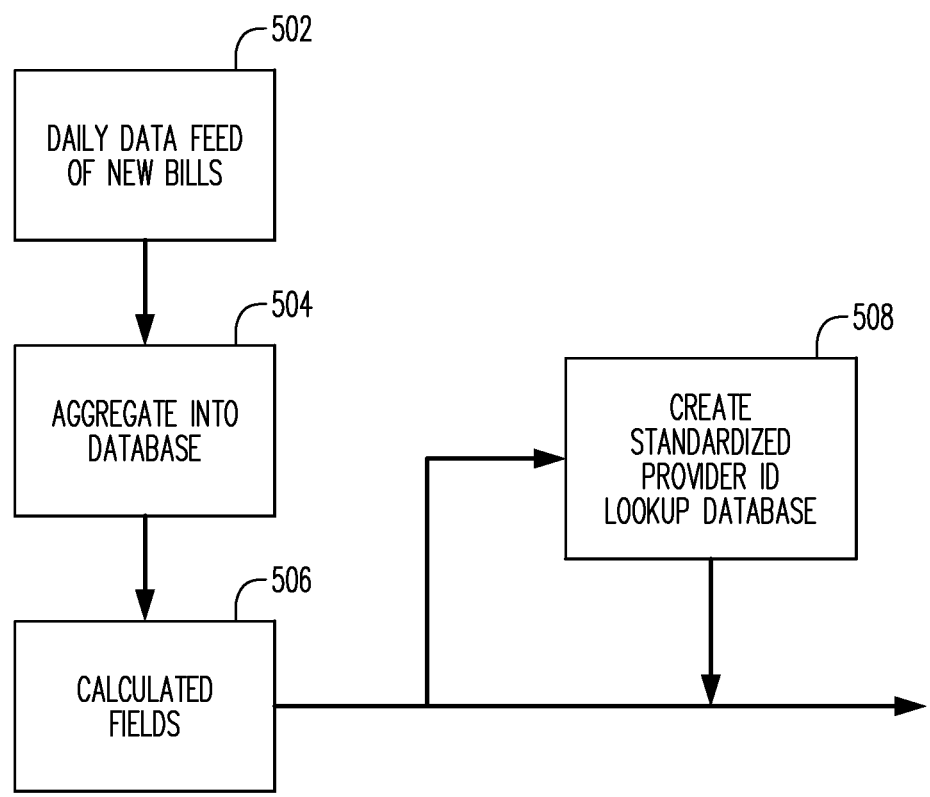
FIGS. 5-8 are diagrams that show details of the process of FIG. 4.

Block 402 in FIG. 4 represents receiving of data feeds and aggregation of the received data. FIG. 5 illustrates some details of block 402. In FIG. 5, block 502 represents the above-mentioned daily feed of bills. The data provided by this feed may indicate, for each bill, attributes such as bill number, claim representative name, bill date, date received by policy holder, date received by bill intake processor, data generated by intake processing, information relating to pendency of the bill, information relating to communications with the intake processor and others, information related to intake approval of the bill, information identifying the claim to which the bill relates and information related to the service provider including provider name, tax ID (TIN), location, etc. (The foregoing list may not be exhaustive; in a practical embodiment, several dozen data fields may be included for each record.)

In FIG. 5, block 504 follows block 502. At 504, the data feed received at 502 may be integrated into a database. In some embodiments, a commercially available spreadsheet program may be employed. An Access Control List (ACL) may also be established for the data.

Also in FIG. 5, block 506 follows block 504. At block 506, additional data fields are generated by calculations. In some embodiments, this may result in a few dozen additional fields, such as age of the bill, fields relating to the billing date and intake date, and various key data fields.

As indicated at 508 in FIG. 5, the aggregated data, augmented with calculated data fields, is used to create a database in which information may be looked up based on standardized identifiers for the service providers. The standardized identifiers for providers may be created by including every provider name that billed under a given TIN and then determining the most frequently billed provider name for that TIN. That name is then concatenated with the TIN to produce the standardized provider identifier.

Referring again to FIG. 4, it may be desirable to enable geographically-based analysis of provider interrelationships, inasmuch as fraud rings are typically based on local connections among wrongdoers, and may involve improper or fake referrals of patients among service providers who are all within geographical proximity to each other. Accordingly, block 404 in FIG. 4 represents analysis of geographic data.

Figure 6:
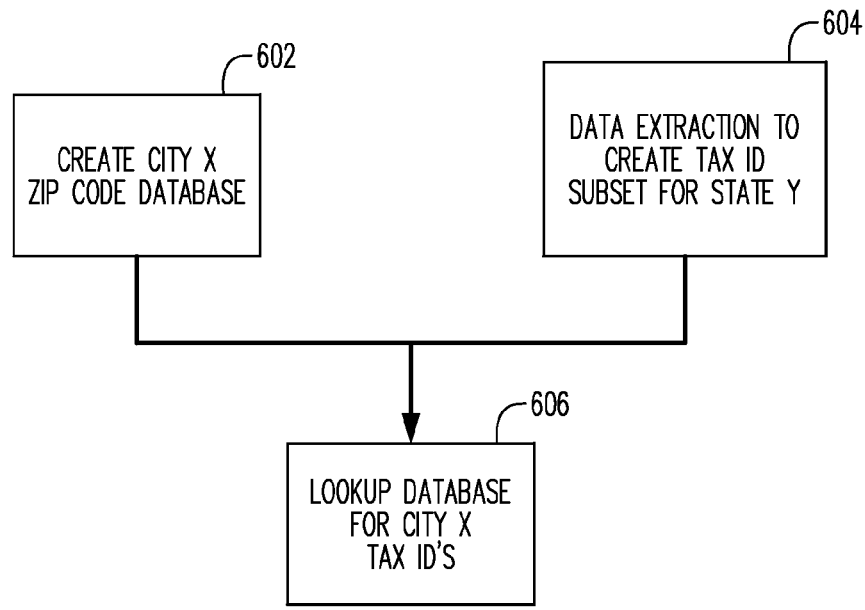

Details of block 404 are shown in FIG. 6. At 602 in FIG. 6, a database may be created that includes all of the U.S. Postal Service zip codes for a particular city. At 604 in FIG. 6, data may be extracted from a source of historical claim and payment data to produce of subset of such data that contains service provider TINs for all service providers located in the geographical U.S. state that contains the city involved in step 602. A conditional formula join process with respect to the data from 602 and 604 provides a lookup database that may contain all the provider TINs of record for the city that was the subject of 602. The resulting lookup database is represented at 606 in FIG. 6.

Figure 7:
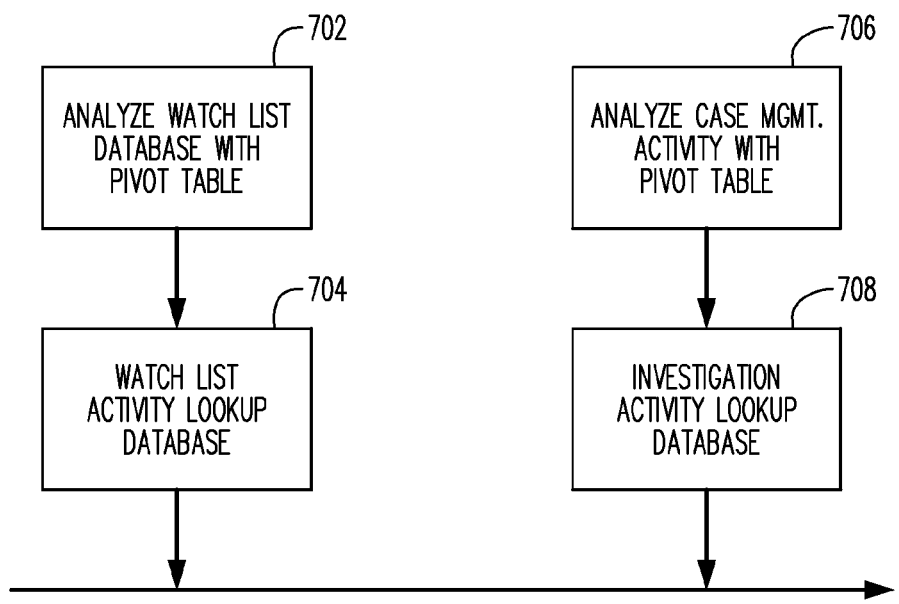

Referring again to FIG. 4, block 406 represents an analysis of watch list and investigation activity data. Details of block 406 are shown in FIG. 7. At 702 in FIG. 7, the watch list database 302 (FIG. 3) is analyzed using a pivot table to identify service provider TINs that are on the list and to indicate the most recent watch list activity with respect to those TINs. The result of this analysis is a watch list activity lookup database, as indicated at 704 in FIG. 7.

At 706 in FIG. 7, the case management data 314 (FIG. 3) is analyzed using a pivot table and calculations to identify all claim identifiers for which the insurance company's SIU had involvement, and also to identify the most recent date of such activity. The resulting investigation activity lookup database is represented by block 708 in FIG. 7.

Referring once more to FIG. 4, the data produced at blocks 402, 404, 406 (as illustrated by FIGS. 5-7) is combined together to produce a final data aggregation represented in FIG. 4 by block 408. The process of FIG. 4 then advances to block 410, at which a provider matrix pivot table is created using the final data aggregation 408. Details of block 410 are shown in FIG. 8.

Figure 8:
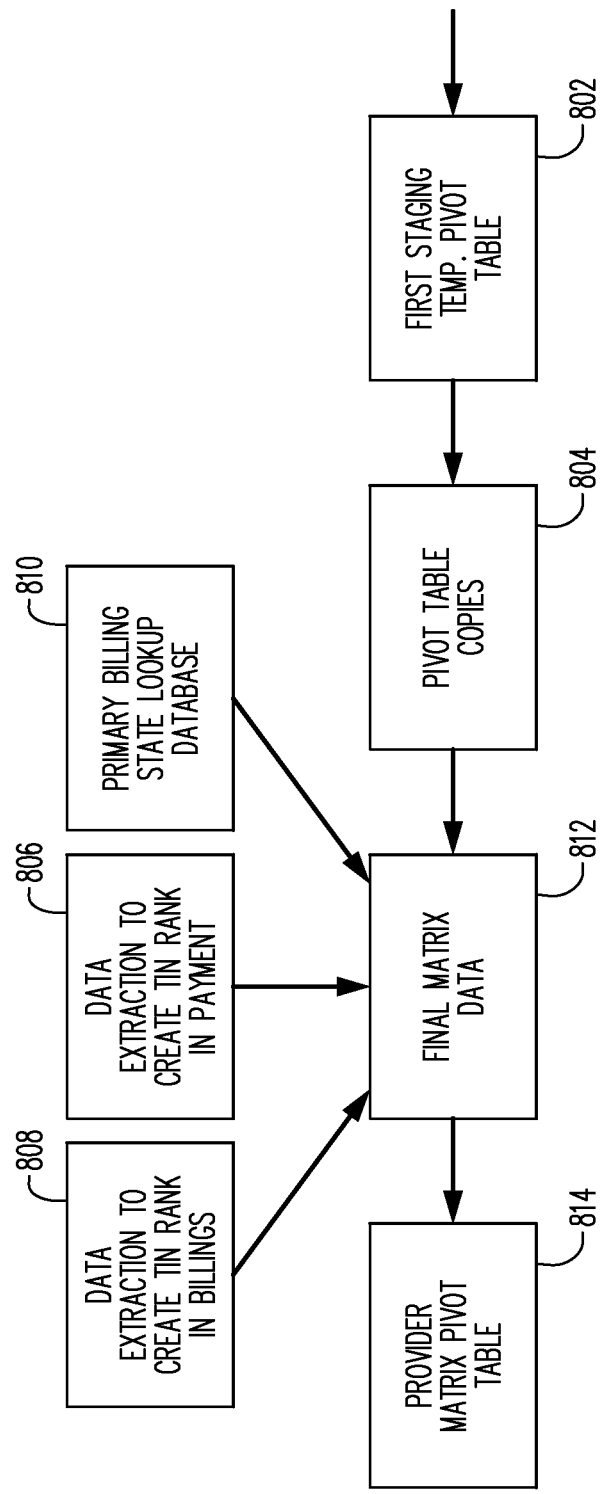

Referring to FIG. 8, at block 802 a first temporary staging pivot table is created. The staging pivot table 802 may be connected to a pivot cache (not shown) which is fed by a daily feed of billing data and is refreshed to receive new records and new standardized provider identifiers and other fields that are generated on a live basis with reference to a clock maintained in the computer system 100.

Data fields provided in the staging pivot table 802 may include the claim identifier, the standardized provider identifier, watch list indicators, a geographic indicator, billing counts, bill age and other related bill timing fields. The data values may be dynamic within the staging pivot table 802, with values detached to allow analysis in static form via one or more pivot table copies as represented at 804 in FIG. 8.

At block 806 in FIG. 8, historical payment data is extracted and aggregated to provide a ranking of provider TINs in terms of "severity" of payment, i.e., the total aggregate amount that had been paid to the service provider in question. Similarly, at block 808, historical billing data is extracted and aggregated to provide a ranking of provider TINs in terms of total amount billed by the associated service provider.

At 810 in FIG. 8, a lookup pivot table is generated for all TINs in the final daily data aggregation, and is sorted to determine the primary U.S. state for which the associated service provider most frequently submits bills.

At 812, a final matrix data table is produced, based on the data provided from blocks 804, 806, 808 and 810. A limited number of additional fields may be generated by calculation, such as age of most recent bill per service provider and total claims with which each provider is associated. These additional fields may be incorporated in the final matrix table 812. Using the final matrix data table 812 as a source, a provider matrix pivot table 814, suitable for analysis in accordance with aspects of the present invention, is produced.

Figure 9:
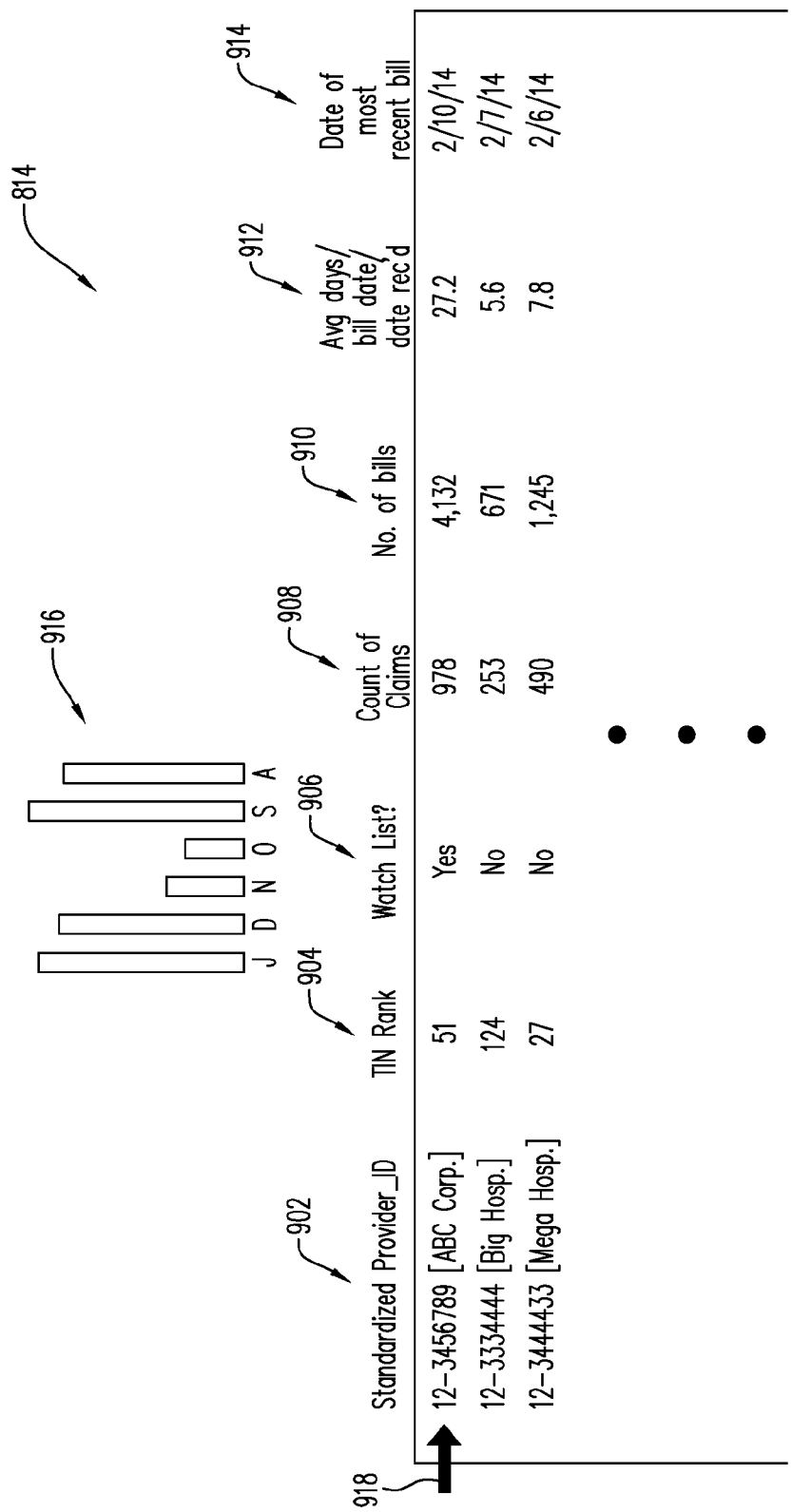
FIG. 9 is a simplified version of an example screen display that may be provided by the computer system of FIG. 1 at one stage of the process of FIG. 4.

FIG. 9 is a simplified and simulated screen display showing an example of the provider matrix pivot table 814. The provider matrix pivot table 814 as depicted in FIG. 9 is a representation of the table before analysis thereof has commenced. Each row in the table represents a respective one of the service providers who have submitted payment requests to the insurance company. To simplify the drawing, only three rows are shown, but in practice the table may have many more rows, perhaps thousands. The first column (reference numeral 902) entry in each row is the standardized provider identifier that was referred to above. In the example illustration shown in FIG. 9, six additional columns are displayed, for providing information about the respective service provider indicated in the first column entry. However, again the drawing is simplified, in that additional columns of data may be provided in a practical example of the provider matrix pivot table 814.

The table columns as depicted in FIG. 9 will first be described, and then there will be a description of additional columns that could be included besides or instead of those depicted in the drawing.

The second column 904 represents the rank of the provider/TIN relative to the other providers in the database with respect to total billings submitted to the insurance company by the provider. This is an indication of the relative importance of the provider in terms of possible need to subject the provider to scrutiny.

The third column 906 represents an indication as to whether the service provider is on a watch list for possibly questionable activities.

The fourth column 908 indicates the total number of claims on which the service provider has requested payments from the insurance company.

The fifth column 910 indicates the total count of bills that the service provider has submitted to the insurance company.

The sixth column 912 indicates the average elapsed time (in days) for the service provider's bills between the date of service for which billing is rendered and the date the bill was received by the insurance company. One factor that may be relevant to the information in this column is that, typically, legitimate service providers seek to render their billings very promptly, whereas sometimes it can be a mark of questionable activity when billing is delayed or held to be released in waves that may be difficult for the payor to oversee. (As referred to herein and in the appended claims, the date of service for which billing is rendered may also be termed the "billing date".)

The seventh column 914 indicates the date of receipt of the most recent bill received from the provider in question. Due to the constraints on presentation for the illustrations for this disclosure, no color is shown in FIG. 9. Nevertheless, in some embodiments there may be color coding indicative elements in the display of the provider matrix pivot table 814. For example, in some embodiments, color coded highlighting may be provided for the entries in column 914 (most recent bill). For example, the coding may be a "heat map", in which the most recent dates are colored "hot" (red or orange) and older dates are colored "cold" (blue or green). The point of such "heat mapping" may be to highlight cases where the bills were quite recently received and so may not yet have been paid; in these situations, intervention to possibly defer payment of the bills pending further scrutiny may be effective, and may represent an opportunity to thwart improper payment requests.

Color highlight may also be employed, for example, to emphasis entries in the "watch list" column 906 where watch list involvement is present.

Other or additional columns that may be present in a practical embodiment of the provider matrix pivot table may include: (a) TIN rank (rank of provider) in terms of total amount paid by the insurance company to the provider (in addition to rank by amount billed, as in column 904, FIG. 9); (b) identification of most recent claim involved in a watch list alert and billed upon by the provider; (c) in addition to column 908, which may indicate the count of claims for the particular TIN, there may be another column that totals claims for that provider across all TINs used by the provider; (d) date of the most recent watch list warning for the TIN in question; (e) date of the most recent referral of a claim to the insurance company's SIU where the provider had billed on that claim; (f) average number of days from date of receipt of bill to completion of intake processing; (g) date of earliest bill from this TIN; (h) age of most recent bill, measured from the date of completion of intake processing.

The foregoing are possible examples of additional or replacement columns; both this list of columns and the types of columns depicted in FIG. 9 are examples that may be varied, from which particular columns may be omitted, and/or to which additional columns may be added.

Another feature that may be shown in the display of FIG. 9 is a bar chart, as indicated at reference numeral 916. For example, each bar may represent the amount billed to the insurance company by a selected provider during a past period of time. The selected provider may be selected via the row for that provider, as indicated in the drawing by arrow 918 indicating selection of the first row. Thus the bar chart represents billing data for the provider "ABC Corp.", having TIN 12-3456789. In the particular simplified example shown for the bar chart, each bar represents a respective calendar month. However, other arrangements of the bar chart may provide bars representing week-by-week time periods. The number of bars in the chart may be more or fewer than the number shown. A graph trend line showing the rolling average of periodic billing totals may also be included. (It is noted that all provider names shown in the drawings or referred to in the description are invented names and do not refer to any actually existing person or entity.)

Referring once more to FIG. 4, once the provider matrix pivot table is available (block 410 in FIG. 4), an analysis of the pivot table matrix data may proceed, as represented by block 412 in FIG. 4. Details of block 412 are illustrated in FIG. 10, which is a flowchart summarizing an analysis process as provided in accordance with aspects of the present invention.

Figure 10:
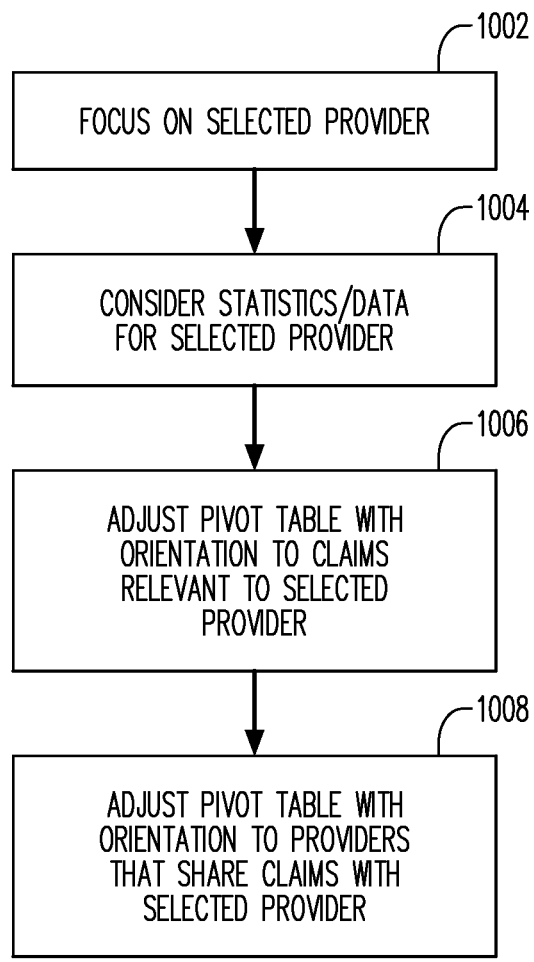
FIG. 10 is a flowchart that illustrates additional details of the process of FIG. 4.

At block 1002 in FIG. 10, the operator of the computer 201 may focus the computer system 100 on a particular service provider, perhaps because there is serious concern about payment requests that that provider has made to the insurance company. The operator of the computer 201 may be an investigative analyst who uses his/her knowledge and information available in the data set to select the particular provider for additional scrutiny. The information that guides the operator in selecting a service provider may include the number of claims for which the service provider has submitted payment requests and/or the service provider's rank among other service providers relative to number of claims involving the service provider. In addition or alternatively, a consideration may be the "severity" (i.e., magnitude or relevant dollar amounts) of requests for payment. In addition or alternatively, the operator may consider information related to the service provider arising from watch list activity and/or case investigations undertaken by the insurance company and/or possible links with one or more other service providers who have been scrutinized by the insurance company. The operator may exercise professional judgment in selecting a service provider for scrutiny.

As part of a user's scrutiny of the service provider in question, the user may operate the computer system 100 so that it displays information about the service provider, such as (a) how the service provider ranks in comparison to other service providers in terms of total amount of billings to the insurance company (sometimes referred to as a "severity rank"); (b) watch list activity, including any alert, date of the alert, subject of the alert; (c) any activity by the insurance company special investigations unit with respect to any claim under which the provider submitted bills; (d) total number of claims for which the service provider submitted bills; (e) total number of bills submitted by the provider; (f) average amount of time involved in submitting and processing the provider's bills; (g) date range of earliest and most recently received bills from the provider; and (h) the age of the provider's most recent bill.

Figure 11:
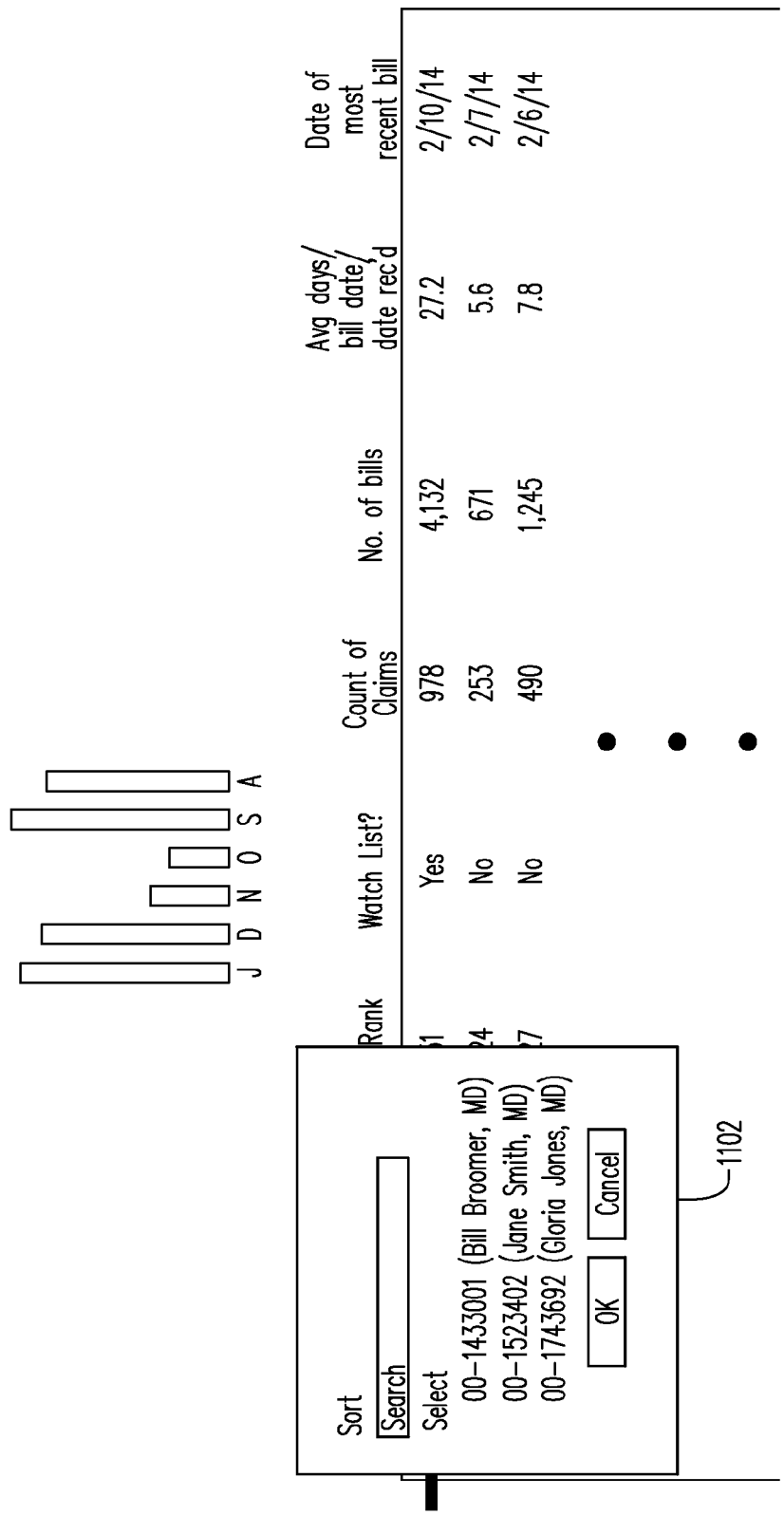

FIG. 11 is another example screen display that may be provided in the computer system 100 of FIG. 1. FIG. 11 is similar to FIG. 9, except that it also includes a contextual menu 1102 that the user may open in association with the standard provider identifier column (902 in FIG. 9). Continuing to refer to FIG. 11, the user may interact with the contextual menu 1102 to readily search for and/or select a particular service provider considered to be of particular interest for possible related investigations.

Figure 12:
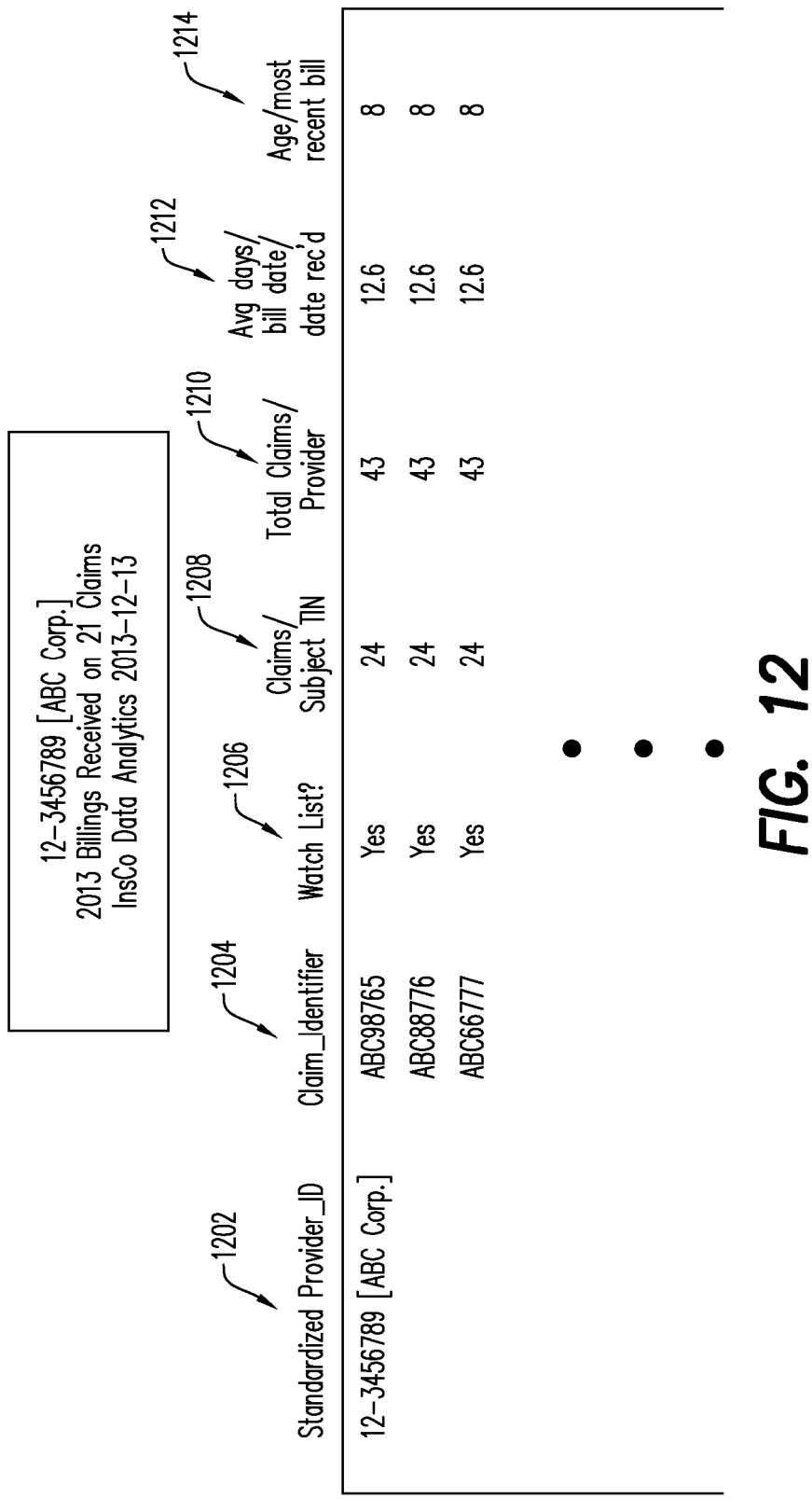

Referring again to FIG. 10, at 1004 the user may consider statistics and data relevant to the selected provider to determine whether investigation into other related providers is in order. FIG. 12 is an example simplified screen display that may be provided in the computer system 100. FIG. 12 shows all claims for which the provider in question has submitted requests for payment, with other data having been filtered out (i.e., no other providers, and no data specific to other providers, is included in the display shown in FIG. 12). (To simplify the drawing, only the first few rows are shown. It will be noted that the provider of interest is assumed to be "ABC Corp.")

In the example illustration of FIG. 12, the number of columns shown may be less than the number of columns that may be displayed for a corresponding table in a practical embodiment of the computer system 100. First the columns as presented in the drawing will be described, and subsequently there will be a description of other or additional columns that may be provided in a practical embodiment.

The first column in FIG. 12 (reference numeral 1202), may correspond to the standardized provider identifier for the service provider. The second column (reference numeral 1204) may correspond to claim identifiers for claims under which the service provider has submitted requests for payment.

The third column shown in FIG. 12 (reference numeral 1206) may contain an indication as to whether the service provider has been the subject of a watch list alert. The next column (reference numeral 1208) indicates the number of claims for which the provider has submitted bills to the insurance company using the TIN listed in the first column. The column after that (reference numeral 1210) indicates the total number of claims on which the provider has submitted bills for all TINS used by the provider.

Column 1212 in FIG. 12 indicates the average elapsed time (in days) for the service provider's bills between the date of service for which billing is rendered and the date the bill was received by the insurance company. Column 1214 indicates the age of the most recent bill submitted for the claim listed in the second column submitted by the service provider.

In some embodiments, the following additional or replacement columns may be included in a display like that shown in FIG. 12: (a) Rank of TIN in terms of total amount billed; (b) rank of TIN in terms of total amount paid; (c) most recent watch list involvement; (d) number of bills received; (e) average time elapsed, in days, from receipt of bill to completion of intake; (f) date of earliest bill received from the TIN in question; (g) date of receipt of most recent bill from the TIN; (h) age of most recent bill, measured from the date of completion of intake processing.

Figure 13:
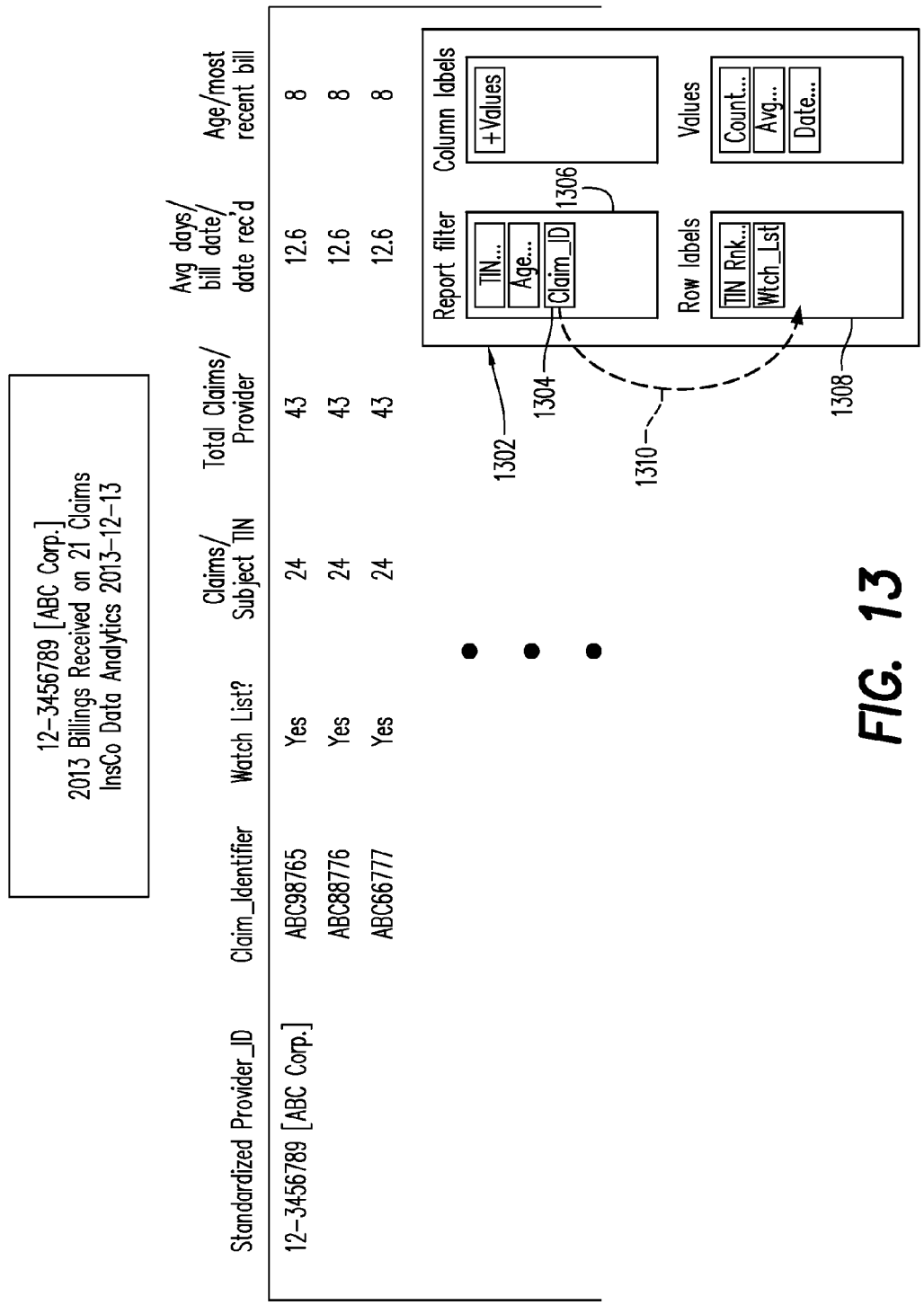

Referring once more to FIG. 10, block 1006 follows block 1004. At 1006, the user interacts with the computer 201 to cause the pivot table to be adjusted to display information related to the claims for which ABC Corp. submitted payment requests. For example, and referring to FIG. 13, the user may interact with a table control block shown at 1302. (Apart from also including table control block 1302, FIG. 13 is similar to FIG. 12.) In particular, the user may move the "Claim identifier" field (reference numeral 1304) from the report filter area 1306 to the row label area 1308. This action by the user is represented by dotted-line arrow 1310.

Next, and as illustrated in FIG. 14, the user may interact with contextual menu item 1402 ("Filter"), selecting sub-item 1404 ("Keep only selected items"). Still further, as illustrated in FIG. 15, the user may select "Clear Filter" (reference numeral 1505) from the menu associated with the provider ID column. (Again, apart from user control elements shown therein, FIGS. 14 and 15 are similar to FIG. 12.) As a result, all providers related to the claims listed in the display of FIGS. 12-15 will be assembled for the next table view, which is shown (in simplified, simulated form) in FIG. 16.

The columns presented in the screen display of FIG. 16 may be the same as those shown in FIG. 12. However, the first column (reference numeral 1202) now lists the provider IDs for all the other providers that also submitted payment requests for those claims. In other words, the table as now presented in FIG. 16 lists all providers that share claims with ABC Corp., as indicated at block 1008 in FIG. 10.

In some embodiments, color-coded "heat map" indicators, or other colored indicators relating to watch list involvement, may be included in the display, in similar fashion as was discussed above in connection with columns 914 and 906 of FIG. 9.

The screen display as shown in FIG. 16 may provide information that is very useful in potentially identifying questionable activity by providers. For example, if the initial provider of interest (in this instance, "ABC Corp.") is the subject of serious concern as to its legitimacy, all the providers listed in column 1604 may well merit scrutiny because of their connection with ABC Corp. through shared claims. Data present in the display of FIG. 16 may help to prioritize the listed providers in terms of how urgent it is that they be scrutinized. For example, if one of the providers is already watch-listed (column 1605), that may be a reason to scrutinize the particular provider more closely and/or urgently than other providers shown in the display. Another factor that may weigh in favor of closer or more urgent scrutiny may be the number of claims for which the provider has submitted payment requests.

In the particular simulated example display of FIG. 16, another potential insight is illustrated with respect to the three rows (reference numerals 1605, 1610, 1615) in which the same provider (chiropractor Bill Brown) appears, but with different TINs in each row. Thus the display of FIG. 16 allows an operator to note the use by a provider of multiple TINs, which under these circumstances is highly unlikely to be a legitimate arrangement. Accordingly, in this simulated situation, it appears quite probable that at least some of Dr. Brown's payment requests may be questionable, and it may well be warranted to call up additional data relating to Dr. Brown's billings and/or to hold up payment of his requests pending further steps, such as further review, etc. Furthermore, the process of FIG. 10 may be repeated with Dr. Brown as the "selected provider" to identify service providers who share claims with Dr. Brown, thereby again potentially identifying service providers who may warrant further scrutiny.

Data available through a display like FIG. 16 may also make it rather simple to identify providers for whom a large proportion of their billings are for claims shared with another provider who is of doubtful legitimacy. This, too, may be a strong indicator that the former group of providers themselves may be questionable.

Figure 17:
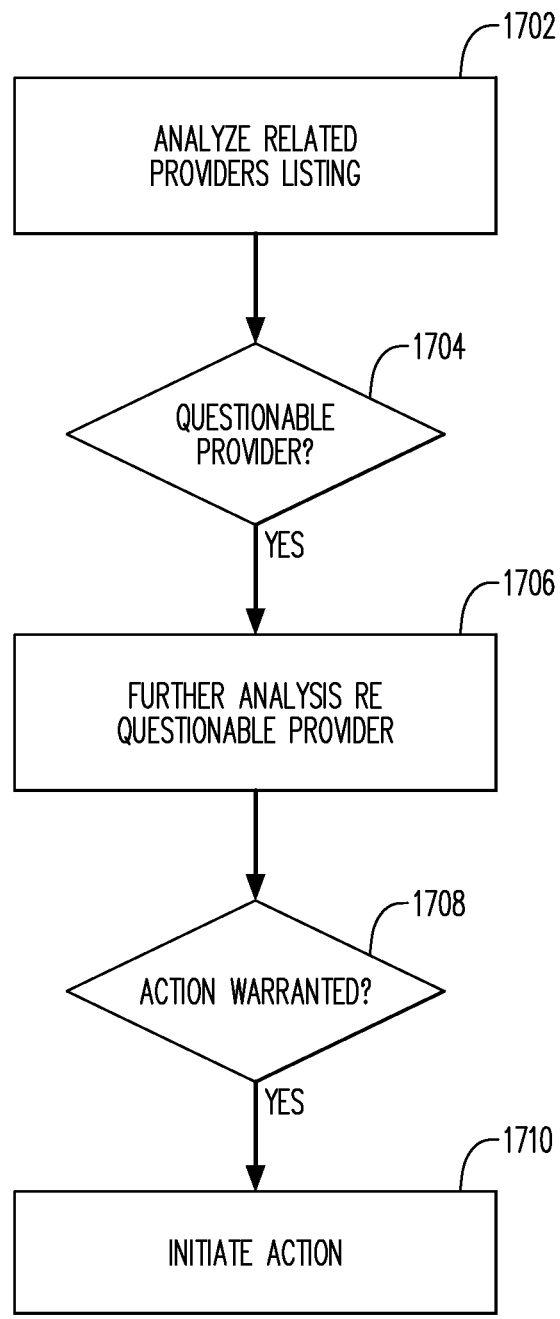
FIG. 17 is a flowchart that illustrates additional process stages that may be performed in operation of the computer system of FIG. 1.

FIG. 17 is a flow chart that illustrates further process steps that may follow on from the process of FIG. 10. At block 1702 in FIG. 17, a human operator may analyze displayed data such as that simulated in FIG. 16 to, e.g., identify additional providers who may exhibit activity such as using multiple TINs, sharing a high proportion of patients with another provider who is of doubtful legitimacy, etc. At decision block 1704 it is determined whether a questionable service provider is identified by the analysis of block 1702. If so, then block 1706 follows decision block 1704. At block 1706, the user may call up and analyze additional data relating to the questionable provider identified at 1702 and 1704. From the analysis performed at 1706, it may be determined (decision block 1708) whether action is warranted at the current time relative to the questionable provider identified at 1702 and 1704. One factor in determining whether to take action may be whether the provider now under scrutiny has a relatively large quantity of billing that has been recently received and is awaiting payment by the insurance company.

If a positive determination is made at decision block 1708 (i.e., if it is determined that action is warranted), block 1710 may follow decision block 1708. At block 1710, suitable action may be taken, such as deferring payment of the provider's currently pending payment requests, informing the provider that the insurance company is requiring submission of further information, and/or summoning the provider to appear for questioning under oath, etc. For example, the processor 114 (FIG. 1) may issue an instruction to the payment processing system 124 to defer payment of currently pending bills from the provider and/or to inform the provider that the provider must perform one or more steps before payment will be made.

Returning once more to FIG. 4, a billing analysis (block 414) may also be performed using the final data aggregation produced at block 408. For this analysis, a standard provider identifier may be selected. A display may be generated for that provider identifier including all bills submitted by the provider for the current period of time, the associated claims, the nonstandard provider identifiers associated with the bills and age of the bills ("heat map" color coding may also be provided, as described above in connection with columns 914 and 906 of FIG. 9, and also referred to in connection with FIG. 16). Other age-of-bill or other bill timing data may also be included in the display for billing analysis. In some embodiments, the data may be sorted so that the most recently received bill is displayed in the first row of the table, with other bills displayed in descending order by date received.

The computerized analyses described herein may be highly effective in identifying links between a questionable service provider and other providers who should also be scrutinized for the purpose of preventing payment of questionable bills. The computer system disclosed herein is effective in uncovering such links even with respect to a very large quantity of data, such as data for thousands of providers and hundreds of thousands of bills. Moreover, the computer system disclosed herein allows the provider linkage analysis to be performed very rapidly and in time to forestall payment of questionable bills, even in an environment in which bills are processed for very prompt payment.

Another type of information that the computer system 100 may be helpful in uncovering is billing for services where the provider is located in one state but the billing for the service is repriced in another state. It may be desirable that such bills and/or providers be subjected to scrutiny to guard against payment of questionable billings. Such information may be called up from the computer system 100 by specifying the state of location of providers, and the (other) state of pricing of bills to produce an output screen that lists the providers who have submitted such bills, the number of such bills submitted by each such provider, and the age of the most recent bill.

In particular examples illustrated herein, the computer system 110 was applied to analysis of billings by medical service providers. However, teachings of the present invention have other applications as well. For example, a linked provider analysis using the computer system 100 can also be applied to find linkages among automotive towing and repair service providers, or among providers of building repair services.

The process descriptions and flow charts contained herein should not be considered to imply a fixed order for performing process steps. Rather, process steps may be performed in any order that is practicable.

As used herein and in the appended claims, the term "insurance action" refers to activities undertaken by an insurance company or a contractor for an insurance company in connection with processing an insurance claim and/or responding to or processing a request for payment by a service provider in connection with an insurance claim; and includes actions such as (i) requesting additional information from a service provider in connection with the service provider's request for payment, and (ii) deferring payment of a service provider's request for payment.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
a historical claim and payment database corresponding to claims by service providers requesting payment from an insurance company;
a watch list database configured to aggregate warning data corresponding to service providers;
a case management data feed including suspect provider data corresponding to service providers under investigation for billing issues;
a vendor taxpayer identification number (TIN) address database configured to receive, store, and provide access to service provider address data and service provider TIN data;
a provider periodic billing database configured to receive, store, and provide access to periodic total billing data for the service providers;
a bill analysis platform configured to:
  generate, on a daily basis, a daily provider bill database based on the warning data, the suspect provider data, and daily bill data corresponding to daily bills received at a rate of hundreds of thousands of submissions per year for thousands of service providers by a communications device from service provider computer systems corresponding to a first set of service providers;
  analyze the historical claim and payment database of claims and payment and the provider periodic billing database to (i) identify service provider TINs and generate a geographic lookup database for service provider TINs within a geographical location, (ii) rank the service provider TINs by total aggregate payments made to each service provider; and (iii) rank the service provider TINs by a total billed by each service provider;
  responsive to the analysis of the historical claim and payment database of claims and payment and the provider periodic billing database, generate a daily matrix database;
  generate, based upon the daily matrix database, a provider matrix pivot table for identifying organized groups of service providers submitting questionable bills, said provider matrix pivot table dynamically configurable to identify all service provider TINs used by a single service provider, identify all service provider TINs relating to a single claim, and identify all service provider TINs within a geographical location via the geographic lookup database, said provider matrix pivot table displaying color-coded graphic elements for generating a heat map corresponding to at least a watch list column and a date of most recent bill column, and said provider matrix pivot table further displaying selected data to identify the organized groups of service providers including (i) a service provider identifier column, (ii) a TIN rank column indicating a rank of the service provider by aggregate payments made to the service provider, (iii) the watch list column indicating whether the service provider is on the watch list, (iv) a claim count column indicating a number of claims corresponding to the service provider, and (v) the date of most recent bill column indicating a date of a most recent bill corresponding to the service provider;
an input device, coupled to the bill analysis platform, for inputting information to identify, from the provider matrix pivot table, a first service provider for analysis, the first service provider associated with a plurality of insurance claims; and
a display device, coupled to the computer processor, for displaying results of said analyzing of the first service provider, said displayed results including (i) data corresponding to the first service provider; and (ii) other provider data corresponding to other service providers who are also associated with at least one of the plurality of insurance claims corresponding to the first service provider, the displayed other provider data including, for each of the other service providers: (a) service provider identifying data; and (b) a taxpayer identification number (TIN).

2. The computer system of claim 1, wherein the bill analysis platform is further configured to trigger an insurance action.

3. The computer system of claim 1, wherein the bill analysis platform is further configured to generate a lookup database of service provider TINs for a selected city.

4. The computer system of claim 1, wherein the other provider data displayed by the display device further includes an age of a payment request submitted by a respective one of the service providers.

5. The computer system of claim 4, wherein said displaying includes:
displaying an associated color-coded graphic element with at least some of the other provider data, the color-coded graphic element indicative of said age of said payment request received from a corresponding other service provider.

6. The computer system of claim 1, wherein said displaying includes:
displaying for each of the other service providers an indication as to whether said each of the other service providers is in the watch list database.

7. The computer system of claim 1, wherein said displaying includes:
displaying associated claim data and total claim data for each of said other service providers, said associated claim data indicating a number of claims that said each other service provider shares with said first service provider, said total claim data indicating a total number of claims for which said each other service provider has submitted payment requests to said insurance company.

8. A computerized method, the method comprising:
accessing a historical claim and payment database corresponding to service providers;
aggregating warning data corresponding to service providers in a watch list database;
receiving, from a case management data feed, suspect provider data corresponding to service providers under investigation for billing issues;
generating a vendor taxpayer identification number (TIN) address database configured to receive, store, and provide access to service provider address data and service provider TIN data;
accessing a provider periodic billing database configured to receive, store, and provide access to periodic total billing data for the service providers;
storing, in a computer, a database of payment request records, the payment request records representing payment requests submitted to an insurance company by the service providers;

generating, by a bill analysis platform on a daily basis, a daily provider bill database based on the warning data, the suspect provider data, and daily bill data corresponding to daily bills received at a rate of hundreds of thousands of submissions per year for thousands of service providers by a communications device from service providers corresponding to a first set of service providers;

analyzing, by the bill analysis platform, the historical claim and payment database of claims and payment and the provider periodic billing database to (i) identify service provider TINs and generate a geographic lookup database for service provider TINs within a geographical location, (ii) rank the service provider TINs by total aggregate payments made to each service provider; and (iii) rank the service provider TINs by a total billed by each service provider;

responsive to the analysis of the historical claim and payment database of claims and payment and the provider periodic billing database, generating, by the bill analysis platform, a daily matrix database;

generating, by the bill analysis platform based upon the daily matrix database, a provider matrix pivot table for identifying organized groups of service providers submitting questionable bills, said provider matrix pivot table dynamically configurable for identifying all service provider TINs relating to a single claim, and identifying all service provider TINs within a geographical location via the geographic lookup database, said provider matrix pivot table displaying color-coded graphic elements for generating a heat map corresponding to at least a watch list column and a date of most recent bill column, and said provider matrix pivot table further displaying selected data for identifying the organized groups of service providers including (i) a service provider identifier column, (ii) a TIN rank column indicating a rank of the service provider by aggregate payments made to the service provider, (iii) the watch list column indicating whether the service provider is on the watch list, (iv) a claim count column indicating a number of claims corresponding to the service provider, and (v) the date of most recent bill column indicating a date of a most recent bill corresponding to the service provider;

receiving, by an input device coupled to the bill analysis platform, a selection of a first service provider for analysis, the first service provider associated with a plurality of insurance claims; and displaying, by a display device coupled to the computer responsive to selection of the first service provider, (i) data corresponding to the first service provider; and (ii) other provider data corresponding to other service providers who are also associated with at least one of the plurality of insurance claims corresponding to the first service provider, the displayed other provider data including, for each of the other service providers: (a) provider identifying data; and (b) a taxpayer identification number (TIN).

9. The method of claim 8, further comprising:
triggering, by the computer, an insurance action.

10. The method of claim 9, wherein the insurance action includes:
deferring payment by the insurance company of at least one payment request received from at least one of the other service providers.

11. The method of claim 10, wherein the insurance action further includes:

requesting additional information from said at least one of the other service providers.

12. The method of claim 8, further comprising:
generating a lookup database of service provider TINs for a selected city.

13. The method of claim 8, wherein the displayed other provider data includes an age of a payment request submitted by a respective one of the service providers.

14. The method of claim 13, wherein said displaying includes:
displaying an associated color-coded graphic element with at least some of the other provider data, the color-coded graphic element indicative of said age of said payment request received from a corresponding other service provider.

15. The method of claim 8, wherein said displaying includes:
displaying for each of the other service providers an indication as to whether said each of the other service providers is in the watch list database.

16. The method of claim 8, wherein said displaying includes:
displaying associated claim data and total claim data for each of said other service providers, said associated claim data indicating a number of claims that said each other service provider shares with said first service provider, said total claim data indicating a total number of claims for which said each other service provider has submitted payment requests to said insurance company.

17. The method of claim 8, further comprising:
detecting that at least one of the other service providers has more than one TIN.

18. The method of claim 8, further comprising:
interacting with a pivot table feature of a spreadsheet program to initiate said displaying.

19. The method of claim 8, wherein said displaying includes:
displaying data indicative of elapsed time between billing dates and dates when requests for payment were received by the insurance company.

20. The method of claim 8, wherein the service providers are medical service providers.

21. A non-transitory medium having program instructions stored thereon, which instructions when executed, cause the computer processor to:
access a historical claim and payment database corresponding to claims by service providers requesting payment from an insurance company;
aggregate warning data corresponding to service providers in a watch list database;
receive, from a case management data feed, suspect provider data corresponding to service providers under investigation for billing issues;
generate a vendor taxpayer identification number (TIN) address database configured to receive, store, and provide access to service provider address data and service provider TIN data;
access a provider periodic billing database configured to receive, store, and provide access to periodic total billing data for the service providers;
store a database of payment request records, the payment request records representing payment record requests submitted to the insurance company by the service providers;
generate, by a bill analysis platform on a daily basis, a daily provider bill database based on the warning data, the suspect provider data, and daily bill data corresponding to daily bills received at a rate of hundreds of thousands of submissions per year for thousands of service providers by a communications device from service providers corresponding to a first set of service providers;

analyze, by the bill analysis platform, the historical claim and payment database of claims and payment and the provider periodic billing database to (i) identify service provider TINs and generate a geographic lookup database for service provider TINs within a geographical location, (ii) rank the service provider TINs by total aggregate payments made to each service provider; and (iii) rank the service provider TINs by a total billed by each service provider;

responsive to the analysis of the historical claim and payment database of claims and payment and the provider periodic billing database, generate, by the bill analysis platform, a daily matrix database;

generate, by the bill analysis platform based upon the daily matrix database, a provider matrix pivot table for identifying organized groups of service providers submitting questionable bills, said provider matrix pivot table dynamically configurable to identify all service provider TINs used by a single service provider, identify all service provider TINs relating to a single claim, and identify all service provider TINs within a geographical location via the geographic lookup database, said provider matrix pivot table displaying color-coded graphic elements for generating a heat map corresponding to at least a watch list column and a date of most recent bill column, and said provider matrix pivot table further displaying selected data to identify the organized groups of service providers including (i) a service provider identifier column, (ii) a TIN rank column indicating a rank of the service provider by aggregate payments made to the service provider, (iii) a watch list column indicating whether the service provider is on the watch list, (iv) a claim count column indicating a number of claims corresponding to the service provider, and (v) the date of most recent bill column indicating a date of a most recent bill corresponding to the service provider;

receive, by an input device coupled to the bill analysis platform a selection of a first service provider for analysis, the first service provider associated with a plurality of insurance claims; and display, by a display device, responsive to selection of the first service provider, (i) data corresponding to the first service provider; and (ii) other provider data corresponding to other service providers who are also associated with at least one of the plurality of insurance claims corresponding to the first service provider, the displayed other provider data including, for each of the other service providers: (a) provider identifying data; and (b) a taxpayer identification number (TIN).

22. A medium according to claim 21, wherein the displayed other provider data includes, for each of the other service providers, an age of a payment request submitted by said each service provider.

23. A medium according to claim 21, further comprising: instructions to trigger an insurance action.

24. The medium of claim 23, wherein the insurance action includes:
deferring payment by the insurance company of at least one payment request received from at least one of the other service providers.

25. The medium of claim 24, wherein the insurance action further includes:
requesting additional information from said at least one of the other service providers.

* * * * *